Patented Sept. 5, 1950

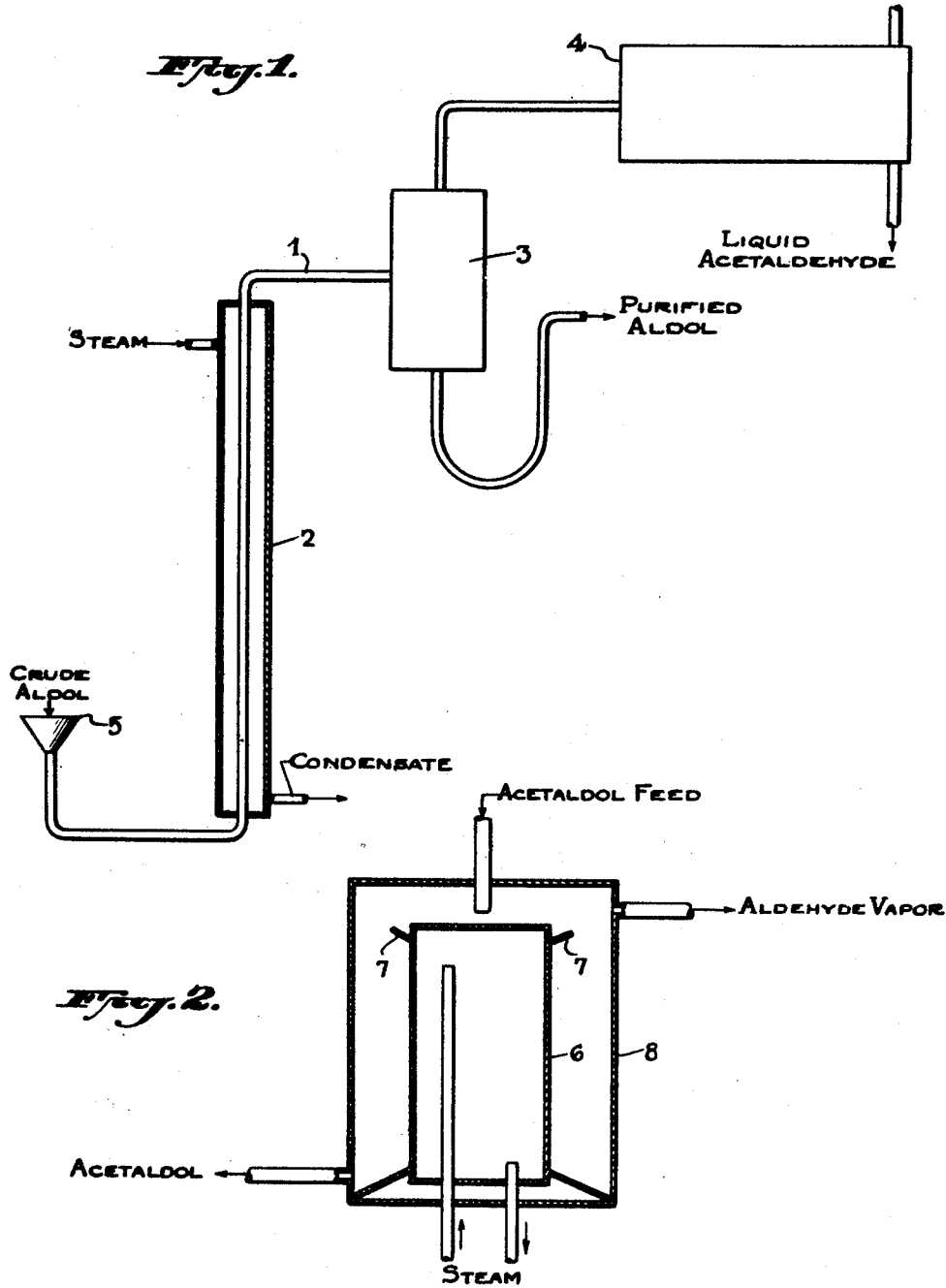

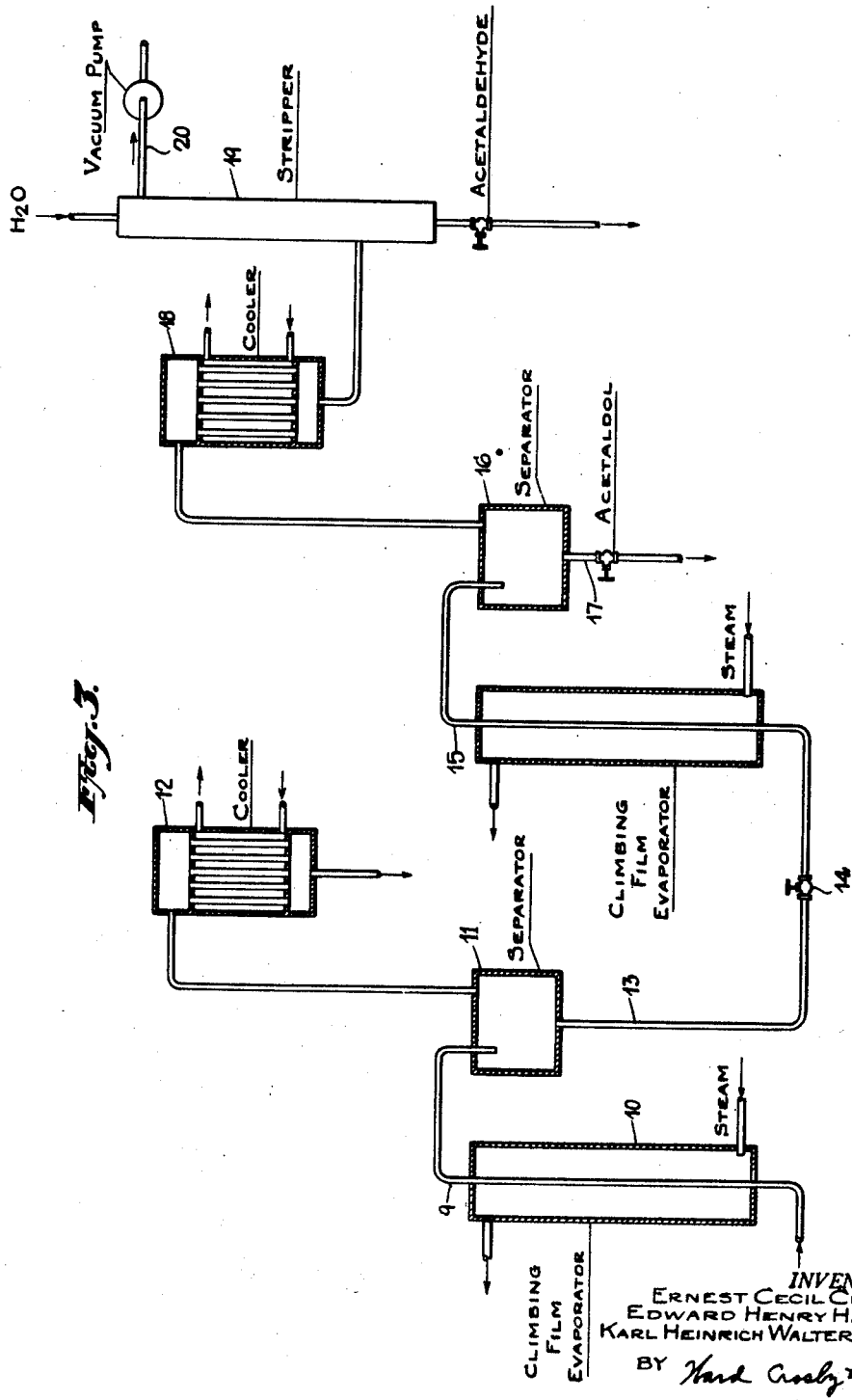

2,521,204

UNITED STATES PATENT OFFICE 2,521,204

PROCESS FOR THE CONCENTRATION OF ACETALDOL

Ernest Cecil Craven, Hedon, Hull, Edward Henry Harbard, Epsom Downs, and Karl Heinrich Walter Tuerck, Banstead, England, assignors of one-half to The Distillers Company, Limited, Edinburgh, Scotland, a British company, and one-half to British Industrial Solvents Limited, London, England, a British company Application October 25, 1946, Serial No. 705,776
In Great Britain October 26, 1945

10 Claims. (Cl. 202—57)

This invention is for improvements in or relating to the concentration of crude acetaldol.

In the preparation of acetaldol by the usual process comprising the condensation of acetaldehyde in the presence of alkaline catalysts, a crude product is obtained which contains up to 50% by weight or more acetaldehyde, part of which is present, not as free aldehyde, but reversibly combined with the acetaldol itself.

In view of the fact that acetaldol decomposes to crotonaldehyde when heated to higher temperatures, it has been suggested to remove the accompanying acetaldehyde by stripping it from the crude acetaldol by means of a current of an inert gas or of a gas containing steam in quantities so small as to prevent condensation of the steam during the stripping at temperatures below 80° C. Though this method avoids the decomposition of the acetaldol to crotonaldehyde, it involves an expensive process for the recovery of the acetaldehyde from the considerable volume of gas by which it is entrained.

We have now found that acetaldehyde can be readily removed from the crude acetaldol in the absence of an entraining gas without formation of crotonaldehyde or undesired condensation products. According to the present invention, there is provided a process for the concentration of crude acetaldol prepared by condensation of acetaldehyde in the presence of an alkaline catalyst which comprises passing said crude acetaldol, neutralized to a pH of 6.5 to 7.5, in the form of a liquid free-flowing film, over a surface heated to a temperature of 90° to 110° C. the contact time being adjusted to a value not exceeding that required to reduce the concentration of acetaldehyde in the liquid to the equilibrium concentration at the temperature employed, separating the evolved acetaldehyde vapours from the liquid residual acetaldol, and condensing the acetaldehyde vapours by cooling. Preferably the crude acetaldol is treated in an evaporator of the "climbing film" type. The invention is based on the discovery that the time of contact required for setting free the acetaldehyde from its combination with acetaldol at the high temperatures necessary is considerably smaller than that which leads to the formation of crotonaldehyde and/or resinous condensation products. This is surprising in view of the many various statements in the literature to the effect that above 80° C. crotonisation of acetaldol occurs readily and that, on the other hand, acetaldol and acetaldehyde form a well-defined stable chemical compound.

The time of contact between acetaldol and the heated surface may be varied according to the temperature of the heated surface and according to the degree of purification from aldehyde required of the acetaldol. The preferred contact times are from 0.5 to 5 seconds.

For a successful operation, the crude acetaldol has to be neutralised beforehand to a pH of 6.5 and 7.5 because if it is at a pH below 6.5, e. g. 5, crotonisation takes place; whilst if above pH 7.5, the acetaldehyde is evolved only slowly, if at all, and resinification of the acetaldol ensues.

The invention may be carried out in various types of apparatus, as long as the formation of a free-flowing film of the liquid in contact with heated surfaces, preferably of heat-conductive material, such as metals, is ensured and the contact time is reduced to no longer than necessary for the evaporation of the aldehyde which can come off at the prevailing temperature.

Thus, for example, the crude acetaldol may be fed on to a vertical "heated finger" which is inside a tube connected to a receiver for the aldehyde vapours, whilst the stripped aldol is collected from the bottom of the finger.

The preferred method, using a "climbing film" evaporator, is to feed the acetaldol into a narrow heated tube so that the vapours of acetaldehyde evolved at the entry to the tube carry a thin film of the acetaldol along the heated walls of the tube.

This tube may, for example, be vertical, so that the rapidly moving acetaldehyde vapours carry the acetaldol upwards, discharging it into a small separator having a swan-necked overflow through which the purified acetaldol is withdrawn, whereas the acetaldehyde vapours pass on to a condenser and receiver. The whole apparatus may be designed as an open S-shaped tube of a suitable diameter, for example, one quarter or three-eighths of an inch inside diameter, the middle part being vertically arranged and provided with a steam-jacket, the acetaldol entering through a funnel at the bottom and at such a rate that the initial evolution of acetaldehyde is rapid enough to cause the acetaldol to climb upwards as a film, and then to discharge into a wider heat-insulated tube, acting as separator, in which vapours and liquid separate. The separator is preferably so designed that the contact time of the purified acetaldol is as small as possible and, in order to prevent crotonisation, the withdrawn purified acetaldol should be cooled immediately.

It is, of course, possible to use a series of parallel tubes connected to one single feed at the bottom end, and one single separator at the top end.

In order to be able successfully to use a "climbing film" type of evaporator, it is important to feed a crude acetaldol rich in acetaldehyde, and for this purpose we carry out the condensation of acetaldehyde to acetaldol only to such a degree that the resulting crude product contains not more than 70% by weight of high boiling material, i. e. aldol.

The process of the invention is preferably carried out at atmospheric pressure, so that the liberated acetaldehyde can be condensed by normal cooling means. However, a slightly increased or slightly reduced pressure may be employed if desired. Thus, for example, the process may be carried out in two stages in the first of which the bulk of the acetaldehyde is removed at atmospheric pressure, and the second stage is carried out at reduced pressure in order to remove the remaining acetaldehyde completely. For this purpose the apparatus may consist of a two-stage climbing film evaporator in which the two heated tubes are connected in series through a separator in which the aldehyde vapours liberated in the first stage are separated from the liquid acetaldol which then passes to the second stage.

The following example illustrates one way of carrying the invention into effect, the percentage figures quoted being calculated as by weight:

A simple copper S-tube is provided with a steam jacket and connected to a heat-insulated separator. The vertical part of the S-tube (which has an inside diameter of three-eighths of an inch) is 3 feet long, and the overflow from the separator is so arranged that it works with a minimum amount of hold-up.

The tube is heated to 100° C. by means of steam introduced into the steam jacket while, through a funnel, crude neutralised acetaldol, having a 60% acetaldol content, was fed at a rate of 2500 g. per hour. The pH of the crude acetaldol, measured electrometrically, was 7.1 per hour, 800-1000 g. of acetaldehyde were thus removed whilst the purified acetaldol collected from the separator contained less than 1% unsaturation, calculated as crotonaldehyde.

By way of contrast to the foregoing example it was found that, when passing the same crude acetaldol through a tower of 1½ inches diameter, 6 feet high, packed with one-quarter inch porcelain saddles and provided with a steam-heated jacket, a rate of flow of as low as 366 g. per hour, was required to produce an 87.5% by weight aldol whereas, at 1075 g. per hour, the acetaldol obtained was only of 77.5% by weight strength. At the same time the crotonaldehyde contents of the withdrawn acetaldol were 7.75% and 4.9% by weight respectively.

The acetaldol obtained in the above-described example was found to have a high degree of reactivity and could, for example, be readily hydrogenated to 1.3-butylene glycol at atmospheric pressure at 70° C. in the presence of a Raney nickel catalyst. Excellent yields of glycol were thereby obtained, the product being free from high-boiling material.

Rapid oxidation to betahydroxybutyric acid occurs on treating the acetaldol purified by this process with oxygen in the presence of an oxygen-carrier catalyst at temperatures between 50° and 80° C as described in United States Serial No. 511,120, now Patent No. 2,411,700.

Referring to the drawings, in order to more fully illustrate the invention, Figure 1 represents a single stage climbing film evaporator and is the apparatus utilized in the example wherein the copper S tube 1, provided with funnel 5 and with steam jacket 2 surrounding the vertical part of the S tube, is connected to heat insulated separator 3, from the bottom of which the purified aldol is removed while the acetaldehyde vapours pass out of the top of the separator and into the cooler 4.

Figure 2 represents another type of climbing film evaporator. It shows a vertical "heated finger" which may be used for the concentration of the crude acetaldol which comprises a glass inner tube 6 provided with vanes 7 and which is steam heated, and is jacketed by glass outer tube 8. The crude acetaldol is fed to the top of the glass tube 6, the acetaldehyde vapours being removed at the top of the outer tube 8 and the stripped aldol collected from the bottom of the tube.

Figure 3 represents a two-stage climbing film evaporator, wherein the bulk of the acetaldehyde is removed from the acetaldol in the first stage at atmospheric pressure and the remaining acetaldehyde removed under reduced pressure in the second stage which comprises a copper S tube 9 provided with steam jacket 10 which is connected with a separator 11. The acetaldehyde vapours pass to the cooler 12 from the top of the separator and the partially concentrated acetaldol passes through line 13 provided with a pressure reducing valve 14 to a second steam jacketed copper S tube 15 connected with separator 16. The concentrated aldol is removed from the separator by line 17, and the acetaldehyde vapours pass to the cooler 18 and finally to the stripper 19 which is connected to the vacuum line 20.

What we claim is:

1. A process for the concentration of crude acetaldol prepared by condensation of acetaldehyde in the presence of an alkaline catalyst which comprises passing said crude acetaldol, neutralised to a pH of 6.5 to 7.5, in the form of a liquid free-flowing film, over a surface heated to a temperature of 90° to 110° C. at a pressure at least as great as atmospheric pressure, the contact time being adjusted to a value not exceeding that required to reduce the concentration of acetaldehyde in the liquid to the equilibrium concentration at the temperature employed, separating the evolved acetaldehyde vapours from the liquid residual acetaldol, and condensing the acetaldehyde vapours by cooling.

2. A process according to claim 1 wherein acetaldol is fed to an evaporator of the climbing film type.

3. A process for the concentration of crude acetaldol prepared by condensation of acetaldehyde in the presence of an alkaline catalyst which comprises passing said crude acetaldol, neutralised to a pH of 6.5 to 7.5, in the form of a liquid free-flowing film, over a surface heated to a temperature of 90° to 110° C., at a pressure at least as great as atmospheric pressure, with a contact time of 0.5 to 5 seconds, separating the evolved acetaldehyde vapours from the liquid residual acetaldol, and condensing the acetaldehyde vapours by cooling.

4. A process for the concentration of acetaldol containing at least 30% by weight of acetaldehyde which comprises passing the mixture of acetaldol and acetaldehyde, neutralised to a pH of 6.5 to 7.5, in the form of a liquid free-flowing film, over a surface heated to a temperature of 90° to 110° C., at a pressure at least as great as atmospheric pressure, the contact time being adjusted to a value not exceeding that required to reduce the concentration of acetaldehyde in the liquid to the equilibrium concentration at the temperature employed, separating the evolved acetaldehyde vapours from the liquid residual acetaldol, and condensing the acetaldehyde vapours by cooling.

5. A process according to claim 4 wherein acetaldol is fed to an evaporator of the climbing film type.

6. A process for the concentration of acetaldol containing at least 30% by weight of acetaldehyde which comprises passing the mixture of acetaldol and acetaldehyde, neutralised to a pH of 6.5 to 7.5, in the form of a liquid free-flowing film, over a surface heated to a temperature of 90° to 110° C., at a pressure at least as great as atmospheric pressure, with a contact time of 0.5 to 5 seconds, separating the evolved acetaldehyde vapours from the liquid residual acetaldol, and condensing the acetaldehyde vapours by cooling.

7. A process for the concentration of acetaldol in a mixture thereof with acetaldehyde which comprises passing a mixture of acetaldol and acetaldehyde containing not more than 70% by weight of acetaldol, neutralised to a pH of 6.5 to 7.5, in the form of a liquid free-flowing film, over a surface heated to a temperature of 90° to 110° C. only until substantially no more acetaldehyde is set free from said acetaldol at the temperature employed.

8. A process for the concentration of crude acetaldol prepared by condensation of acetaldehyde in the presence of an alkaline catalyst which comprises passing said crude acetaldol, neutralised to a pH of 6.5 to 7.5, in the form of a liquid free-flowing film, over a surface heated to a temperature of 90° to 110° C., at a pressure at least as great as atmospheric pressure, with a contact time of 0.5 to 5 seconds, and separating the evolved acetaldehyde vapours from the liquid residual acetaldol.

9. A process for the concentration of crude acetaldol prepared by condensation of acetaldehyde in the presence of an alkaline catalyst which comprises as a first stage passing said crude acetaldol, neutralised to a pH of 6.5 to 7.5, in the form of a liquid free-flowing film, over a surface heated to a temperature of 90° to 110° C., at a pressure at least as great as atmospheric pressure, the contact time being adjusted to a value not exceeding that required to reduce the concentration of acetaldehyde in the liquid to the equilibrium concentration at the temperature employed, to produce a partially purified acetaldol-acetaldehyde mixture, and as a second stage passing the partially purified acetaldol-acetaldehyde mixture over a second surface heated to a temperature of 90° to 110° C. at a pressure below atmospheric pressure, the contact time being adjusted to a value not exceeding that required to reduce the concentration of acetaldehyde in the liquid to the equilibrium concentration at the temperature employed, and separating the evolved acetaldehyde vapours of the two stages from the liquid residual acetaldol.

10. A process for the concentration of acetaldol containing at least 30% by weight of acetaldehyde which comprises as a first stage passing the mixture of acetaldol and acetaldehyde, neutralised to a pH of 6.5 to 7.5, in the form of a liquid free-flowing film, over a surface heated to a temperature of 90° to 110° C., at a pressure at least as great as atmospheric pressure, the contact time being adjusted to a value not exceeding that required to reduce the concentration of acetaldehyde in the liquid to the equilibrium concentration at the temperature employed, to produce a partially purified acetaldol-acetaldehyde mixture, and as a second stage passing the partially purified acetaldol-acetaldehyde mixture over a second surface heated to a temperature of 90° to 110° C. at a pressure below atmospheric pressure, the contact time being adjusted to a value not exceeding that required to reduce the concentration of acetaldehyde in the liquid to the equilibrium concentration at the temperature employed, and separating the evolved acetaldehyde vapors of the two stages from the liquid residual acetaldol.

ERNEST CECIL CRAVEN.
EDWARD HENRY HARBARD.
KARL HEINRICH WALTER TUERCK.

REFERENCES CITED

The following references are of record in the file of this patent:

UNITED STATES PATENTS

| Number | Name | Date |
|---|---|---|
| 1,854,327 | Baum | Apr. 19, 1932 |
| 1,881,853 | Mueller-Conradi et al. | Oct. 11, 1932 |